United States Patent
Baghel et al.

(10) Patent No.: US 10,142,803 B2
(45) Date of Patent: Nov. 27, 2018

(54) PACKET PRIORITY FOR EVOLVED MULTIMEDIA BROADCAST MULTICAST (EMBMS) SERVICE RELAYS

(71) Applicant: QUALCOMM Incorporated, San Diego, CA (US)

(72) Inventors: Sudhir Kumar Baghel, Bridgewater, NJ (US); Haris Zisimopoulos, London (GB); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 15/140,269

(22) Filed: Apr. 27, 2016

(65) Prior Publication Data

US 2016/0381523 A1 Dec. 29, 2016

Related U.S. Application Data

(60) Provisional application No. 62/186,352, filed on Jun. 29, 2015.

(51) Int. Cl.
*H04W 4/08* (2009.01)
*H04W 76/14* (2018.01)
(Continued)

(52) U.S. Cl.
CPC ............... *H04W 4/08* (2013.01); *H04W 4/06* (2013.01); *H04W 8/005* (2013.01); *H04W 24/00* (2013.01);
(Continued)

(58) Field of Classification Search
CPC ..... H04W 40/22; H04W 52/46; H04W 88/04; H04W 76/023; H04W 76/043;
(Continued)

(56) References Cited

U.S. PATENT DOCUMENTS

| | | | |
|---|---|---|---|
| 2015/0029866 A1* | 1/2015 | Liao ..................... | H04W 4/008 370/241 |
| 2016/0227385 A1* | 8/2016 | Ahmad ............... | H04L 65/4061 |
| 2016/0381491 A1* | 12/2016 | Watfa .................. | H04W 8/005 455/41.2 |

FOREIGN PATENT DOCUMENTS

EP            2833694 A2      2/2015

OTHER PUBLICATIONS

3GPP, "3rd Generation Partnership Project; Technical Specification Group Services and System Aspects; Study on Extended Architecture Support for Proximity-based Services (Release 13)," 3GPP TR 23.713 V1.4.0 (Jun. 2015) Technical Report, Jun. 2015, 79 pgs., XP_50966380A, 3rd Generation Partnership Project.
(Continued)

*Primary Examiner* — Ashley Shivers
(74) *Attorney, Agent, or Firm* — Holland & Hart LLP

(57) ABSTRACT

Methods, systems, and devices are described for wireless communication. A user equipment (UE) may receive configuration information for a multimedia broadcast service including a group communication identifier and a priority indicator. The UE may then convey the information in a monitoring request to a relay UE. In some cases the information may be conveyed using the Proximity-based Service (ProSe) signaling protocol. The relay UE may use the configuration information to relay broadcast to the receiving UE. If the relay UE receives multiple priority indicators associated with the same group communication identifier (e.g., from different receiving UEs) it may use the highest priority or the most recent priority.

43 Claims, 10 Drawing Sheets

(51) Int. Cl.
| | |
|---|---|
| *H04W 88/04* | (2009.01) |
| *H04W 52/46* | (2009.01) |
| *H04W 76/23* | (2018.01) |
| *H04W 40/22* | (2009.01) |
| *H04W 24/00* | (2009.01) |
| *H04W 4/06* | (2009.01) |
| *H04W 8/00* | (2009.01) |
| *H04W 76/40* | (2018.01) |

(52) U.S. Cl.
CPC ........... *H04W 40/22* (2013.01); *H04W 52/46* (2013.01); *H04W 76/14* (2018.02); *H04W 76/23* (2018.02); *H04W 76/40* (2018.02); *H04W 88/04* (2013.01)

(58) Field of Classification Search
CPC ..... H04W 24/00; H04W 76/23; H04W 76/14; H04W 76/15; H04W 4/08
See application file for complete search history.

(56) References Cited

OTHER PUBLICATIONS

3GPP, "3rd Generation Partnership Project; Technical Specification Group Services and System Aspects; Group Communication System Enablers for LTE (GCSE_LTE); Stage 2 (Release 13)," 3GPP TR 23.468 V13.1.0 (Jun. 2015) Technical Report, Jun. 2015, 30 pgs., XP_50966259A, 3rd Generation Partnership Project.

ISA/EP, International Search Report and Written Opinion of the International Searching Authority, Int'l. App. No. PCT/US2016/029691, Jul. 7, 2016, European Patent Office, Rijswijk, NL, 12 pgs.

Samsung et al., "ProSe Per Packet Priority Assignment for MBMS Traffic in UE2NW Relay," 3GPP TSG-SA WG2 Meeting #110AH, S2-152830, Sophia Antipolis, France, Aug. 31-Sep. 3, 2015, 3 pgs., XP_51034543A, 3rd Generation Partnership Project.

* cited by examiner

PACKET PRIORITY FOR EVOLVED MULTIMEDIA BROADCAST MULTICAST (EMBMS) SERVICE RELAYS

CROSS REFERENCES

The present application for patent claims priority to U.S. Provisional Patent Application No. 62/186,352 by Baghel et al., entitled "Packet Priority for Evolved Multimedia Broadcast Multicast (EMBMS) Service Relays," filed Jun. 29, 2015, assigned to the assignee hereof.

BACKGROUND

The following relates generally to wireless communication, and more specifically to packet priority for evolved multimedia broadcast multicast (eMBMS) service relays.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless systems may support device-to-device (D2D) communications involving direct wireless communication between user equipments (UEs). D2D UEs may run applications supported via a relay UE to a network to receive data from an application server. In some cases, such as for Multimedia Broadcast Multicast Service (MBMS) or enhanced Multimedia Broadcast Multicast Service (eMBMS), traffic through the relay UE may only be in the downlink (DL) direction. Thus, uplink (UL) messages may not be used to send configuration information regarding the broadcast service to the relay UE. This may result in disruption or delay in the broadcast service through the relay UE.

SUMMARY

A user equipment (UE) may receive configuration information for a multimedia broadcast service including a group communication identifier and a priority indicator. The UE may then convey the information in a monitoring request to a relay UE. In some cases the information may be conveyed using the Proximity-based Service (ProSe) signaling protocol. The relay UE may use the configuration information to relay broadcast to the receiving UE. If the relay UE receives multiple priority indicators associated with the same group communication identifier (e.g., from different receiving UEs) it may use the highest priority or the most recent priority.

A method of wireless communication is described. The method may include receiving a configuration message for a broadcast service, the configuration message comprising a group communication identifier and a priority indicator, transmitting, to a wireless relay, a monitoring request comprising the group communication identifier and the priority indicator, and receiving broadcast content for the broadcast service via the wireless relay based at least in part on the group communication identifier and the priority indicator.

An apparatus for wireless communication is described. The apparatus may include means for receiving a configuration message for a broadcast service, the configuration message comprising a group communication identifier and a priority indicator, means for transmitting, to a wireless relay, a monitoring request comprising the group communication identifier and the priority indicator, and means for receiving broadcast content for the broadcast service via the wireless relay based at least in part on the group communication identifier and the priority indicator.

A further apparatus for wireless communication is described. The apparatus may include a processor, memory in electronic communication with the processor, and instructions stored in the memory and operable, when executed by the processor, to cause the apparatus to receive a configuration message for a broadcast service, the configuration message comprising a group communication identifier and a priority indicator, transmit, to a wireless relay, a monitoring request comprising the group communication identifier and the priority indicator, and receive broadcast content for the broadcast service via the wireless relay based at least in part on the group communication identifier and the priority indicator.

A non-transitory computer-readable medium storing code for wireless communication is described. The code may include instructions executable to receive a configuration message for a broadcast service, the configuration message comprising a group communication identifier and a priority indicator, transmit, to a wireless relay, a monitoring request comprising the group communication identifier and the priority indicator, and receive broadcast content for the broadcast service via the wireless relay based at least in part on the group communication identifier and the priority indicator.

Some examples of the method, apparatuses, or non-transitory computer-readable medium described herein may further include processes, features, means, or instructions for receiving the configuration message via the wireless relay. Additionally or alternatively, in some examples the monitoring request comprises a time stamp.

Some examples of the method, apparatuses, or non-transitory computer-readable medium described herein may further include processes, features, means, or instructions for establishing a device-to-device (D2D) communications link with the wireless relay. Additionally or alternatively, some examples may include processes, features, means, or instructions for transmitting the monitoring request based at least in part on a ProSe signaling protocol.

In some examples of the method, apparatuses, or non-transitory computer-readable medium described herein, the broadcast service comprises an evolved multimedia broadcast multicast service (eMBMS). Additionally or alternatively, in some examples the group communication identifier comprises a temporary mobile group identity (TMGI).

A method of wireless communication is described. The method may include receiving, from a remote wireless device, a monitoring request comprising a group communication identifier and a priority indicator, receiving broadcast content associated with the group communication request, and relaying the broadcast content to the remote wireless device based at least in part on the priority indicator.

An apparatus for wireless communication is described. The apparatus may include means for receiving, from a remote wireless device, a monitoring request comprising a group communication identifier and a priority indicator, means for receiving broadcast content associated with the group communication request, and means for relaying the broadcast content to the remote wireless device based at least in part on the priority indicator.

A further apparatus for wireless communication is described. The apparatus may include a processor, memory in electronic communication with the processor, and instructions stored in the memory and operable, when executed by the processor, to cause the apparatus to receive, from a remote wireless device, a monitoring request comprising a group communication identifier and a priority indicator, receive broadcast content associated with the group communication request, and relay the broadcast content to the remote wireless device based at least in part on the priority indicator.

A non-transitory computer-readable medium storing code for wireless communication is described. The code may include instructions executable to receive, from a remote wireless device, a monitoring request comprising a group communication identifier and a priority indicator, receive broadcast content associated with the group communication request, and relay the broadcast content to the remote wireless device based at least in part on the priority indicator.

Some examples of the method, apparatuses, or non-transitory computer-readable medium described herein may further include processes, features, means, or instructions for relaying a configuration message to the remote wireless device, the configuration message comprising the group communication identifier and the priority indicator. Additionally or alternatively, some examples may include processes, features, means, or instructions for receiving a second priority indicator associated with the group communication identifier.

Some examples of the method, apparatuses, or non-transitory computer-readable medium described herein may further include processes, features, means, or instructions for identifying a maximum priority indicator from a set comprising the priority indicator and the second priority indicator, wherein relaying the broadcast content is based at least in part on the maximum priority indicator. Additionally or alternatively, in some examples the monitoring request comprises a time stamp, and the method further comprising determining a last received priority indicator from a set comprising the priority indicator and the second priority indicator based at least in part on the time stamp, wherein the broadcast content is based at least in part on the last received priority indicator.

Some examples of the method, apparatuses, or non-transitory computer-readable medium described herein may further include processes, features, means, or instructions for establishing a D2D communications link with remote wireless device. Additionally or alternatively, in some examples the monitoring request is transmitted based at least in part on a ProSe signaling protocol.

In some examples of the method, apparatuses, or non-transitory computer-readable medium described herein, the broadcast content comprises eMBMS content. Additionally or alternatively, in some examples the group communication identifier comprises a temporary mobile group identity (TMGI).

BRIEF DESCRIPTION OF THE DRAWINGS

Aspects of the disclosure are described in reference to the following figures.

DETAILED DESCRIPTION

Some wireless systems may support device-to-device (D2D) communications involving direct wireless communication between user equipments (UEs). D2D UEs may run applications supported by a network connection to receive data from an application server. Thus, in some cases a D2D UE may be connected to the network (and hence, the application server) via a relay UE. In some cases, such as with Multimedia Broadcast Multicast Service (MBMS) or enhanced Multimedia Broadcast Multicast Service (eMBMS), traffic through the relay UE may be in the downlink (DL) direction and there may not be any corresponding uplink (UL) traffic from the remote UE. Thus, the D2D receiving the broadcast service may transmit configuration information about the broadcast service to the relay UE in a dedicated message.

The remote UE may then receive the temporary mobile group identity (TMGI) and per-packet priority (PPP) associated with packets that may be broadcast from the application server. The relay UE may then receive packets for the TMGI in DL communication from the network and retransmit the packets to the remote UE. In some cases, a conflict may arise when a relay UE receives different priority levels from different remote UEs for the same TMGI. To resolve this conflict, the relay UE may use the maximum received PPP value or the latest PPP for that TMGI when retransmitting the broadcast.

Aspects of the disclosure are initially described in the context of a wireless communication system. A specific examples is then described for the call flow between an application server, a network, a relay UE and a remote UE. These and other aspects of the disclosure are further illustrated by and described with reference to apparatus diagrams, system diagrams, and flowcharts that relate to packet priority for eMBMS service relays.

Figure 1:
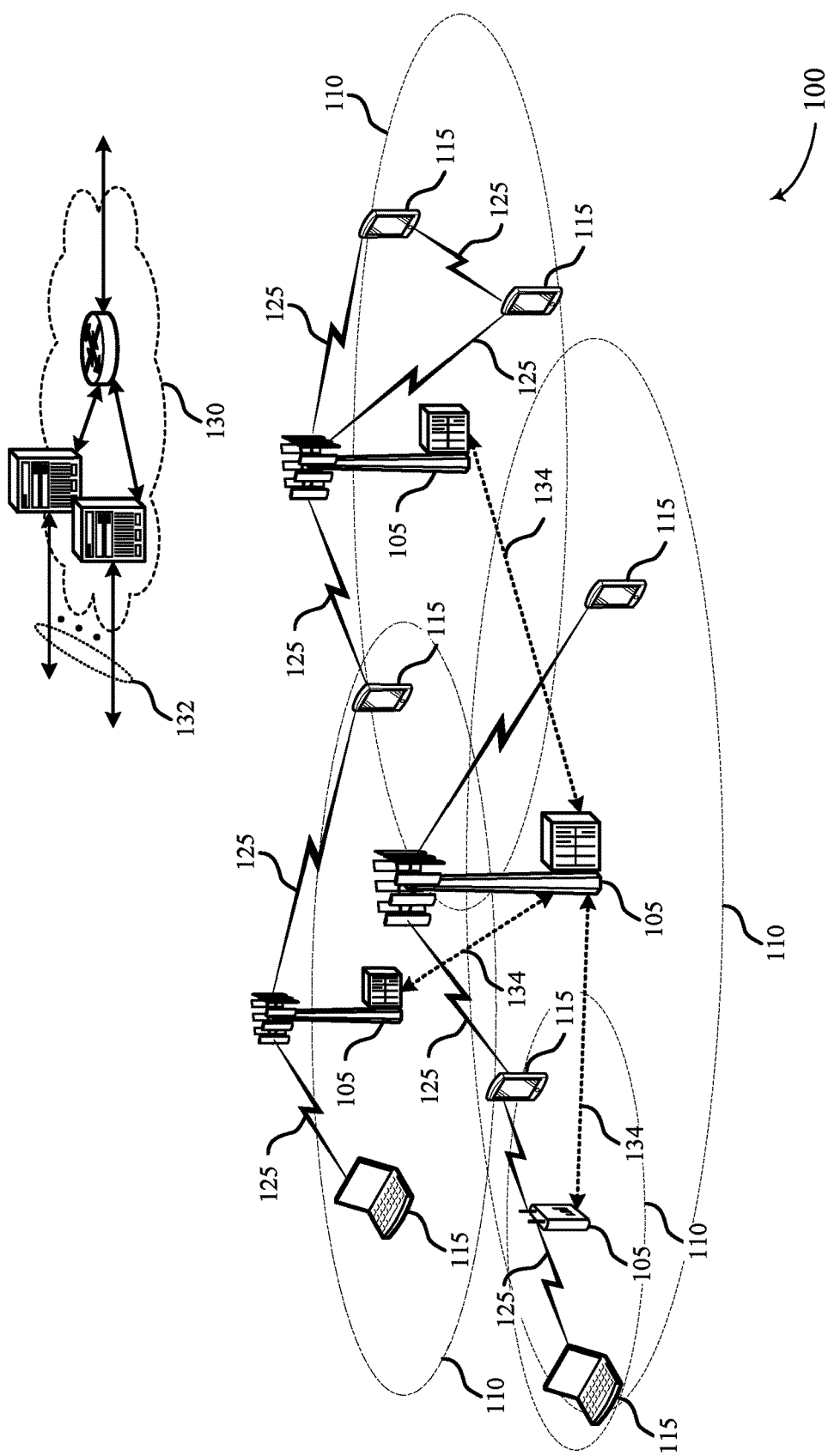
FIG. 1 illustrates an example of a wireless communications system in accordance with various aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-a) network. Wireless communications system 100 may support D2D operations to support MBMS or eMBMS via a D2D relay. For example, a UE 115 receiving an MBMS may transmit configuration information to the relay device as described herein.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some base stations 105 may utilize a portion of the available DL bandwidth to broadcast multimedia data to some or all UEs 115 within the coverage area 110. For example, a wireless communication system may be configured to broadcast mobile TV content, or to multicast live event coverage to UEs 115 located near a live event such as a concert or sporting event. In some cases, this may enable more efficient utilization of the bandwidth. These base stations may be referred to as MBMS or eMBMS cells. In some cases, MBMS cells may be grouped together in a multimedia broadcast single frequency network (MBSFN) such that the broadcast media is transmitted on the same frequency resources by each supporting cell. However, some UEs 115 in the coverage area may elect not to receive the MBMS data. In some cases, an MBMS or eMBMS may be configured with a communication group identifier such as a TMGI and a priority indicator such as a PPP indicator.

Communication links 125 may also be established between UEs 115 in a configuration known as D2D communications. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. In some cases, a UE 115 may receive communications from the network via a relay UE based on D2D operations. For example, a UE 115 receiving an eMBMS may receive the broadcast via a relay UE.

Communication links 125 may also be established between UEs 115 in a configuration known as D2D communications. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a 1:M system in which each UE 115 transmits to every other UE 115 in the group. In some cases, a base station 105 facilitates the scheduling of resources for D2D communications. In other cases, D2D communications are carried out independent of a base station 105. In some cases, a UE 115 may receive communications from the network via a relay UE based on D2D operations. For example, a UE 115 receiving an eMBMS may receive the broadcast via a relay UE.

Some base stations 105 may utilize a portion of the available DL bandwidth to broadcast multimedia data to some or all UEs 115 within the coverage area 110. For example, a wireless communication system may be configured to broadcast mobile TV content, or to multicast live event coverage to UEs 115 located near a live event such as a concert or sporting event. In some cases, this may enable more efficient utilization of the bandwidth. These base stations may be referred to as MBMS or eMBMS cells. In some cases, MBMS cells may be grouped together in a MBSFN such that the broadcast media is transmitted on the same frequency resources by each supporting cell. However, some UEs 115 in the coverage area may elect not to receive the MBMS data. In some cases, an MBMS or eMBMS may be configured with a communication group identifier such as a TMGI and a priority indicator such as a PPP indicator.

A UE 115 may receive configuration information for a multimedia broadcast service including a group communication identifier and a priority indicator. The UE 115 may then convey the information in a monitoring request to a relay UE 115. In some cases the information may be conveyed using the Proximity-based Service (ProSe) signaling protocol. The relay UE 115 may use the configuration information to relay broadcast to the receiving UE 115. If the relay UE 115 receives multiple priority indicators associated with the same group communication identifier (e.g., from different receiving UEs 115) it may use the highest priority or the most recent priority.

Figure 2:
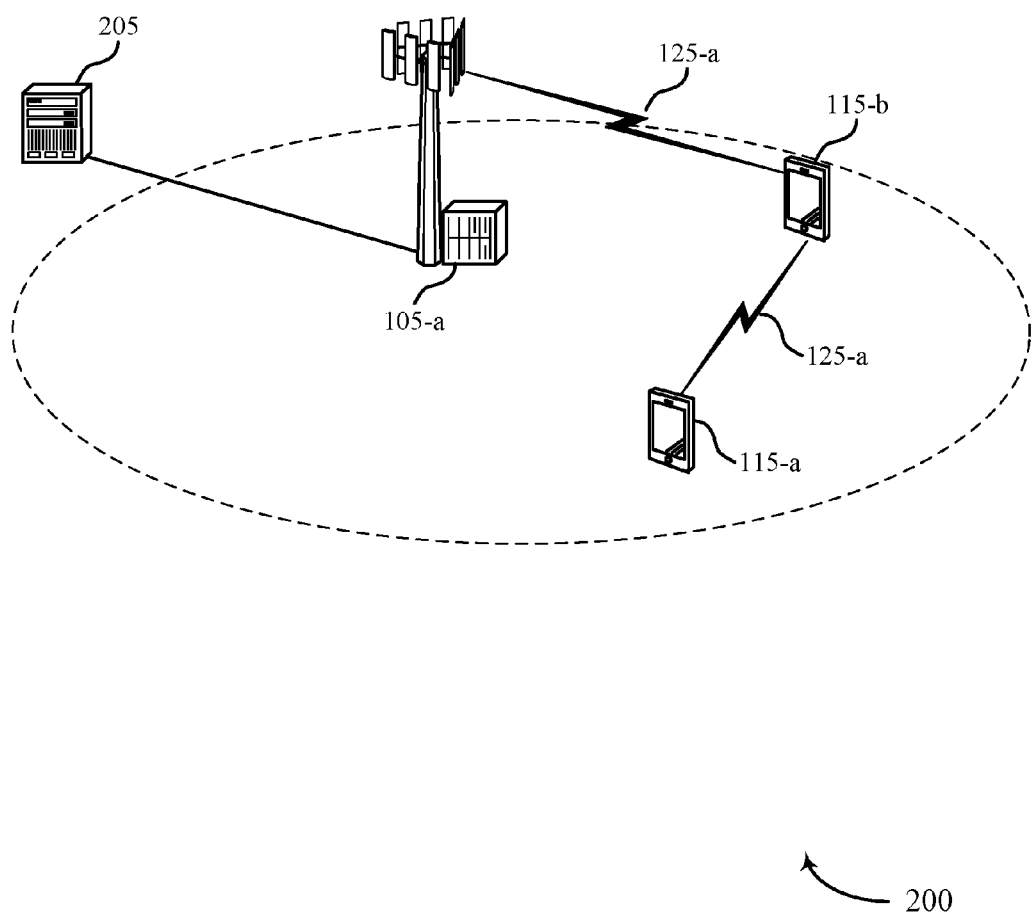
FIG. 2 illustrates an example of a wireless communications subsystem for packet priority for eMBMS service relays in accordance with various aspects of the present disclosure.

FIG. 2 illustrates an example of a wireless communications subsystem 200 for packet priority for eMBMS service relays in accordance with various aspects of the present disclosure. Wireless communications subsystem 200 may include a UE 115-a, UE 115-b and base station 105-a, which may be examples of a UE 115 base station 105 described with reference to FIG. 1. Wireless communications subsystem 200 may support D2D communications involving direct wireless communication between UEs 115-a and 115-b via communication link 125-a. UE 115-b may be connected to base station 105-a via communication link 125-b.

D2D UE 115-a may run applications supported by a communication link 125-a and 125-b to receive data from an application server 205 (e.g., through a core network, not shown, and base station 105-a). Thus, in some cases a D2D UE 115-a may be connected to the network (and hence, the application server) via a relay UE 115-b. In some cases, such as with MBMS or eMBMS, traffic through the relay UE 115-b may only be in the DL direction and there may not be any corresponding UL traffic from the remote UE 115-a. Thus, the D2D receiving the broadcast service may transmit configuration information about the broadcast service to the relay UE 115-b in a dedicated message. For example, an application running in a remote UE 115-a may determine a PPP associated with a packet and may communicate the priority along with the packet through a lower layer transmission to the relay UE 115-*b*. In some cases, the PPP may be determined based on configuration information received by the application from the application server. In some cases the configuration information is transmitted through the relay UE 115-*b*. However, the relay UE 115-*b* may tunnel the information to the receiving UE 115-*a* without indemnifying the information.

To establish the broadcast service, an application running in a remote UE 115-*a* may contact the application server through the network and may inform the application server that it is connected through a relay UE 115-*b*. The remote UE 115-*a* may then receive a TMGI and PPP associated with packets that may be broadcast from the application server. The remote UE 115-*a* may provide the TMGI and the associated PPP of the packets to the relay UE 115-*b*. In one example, the TMGI and PPP mapping may be provided using a protocol such as the ProSe signaling protocol. That is, the ProSe signaling protocol at the remote UE 115-*a* may provide the TMGI and PPP mapping to the relay UE 115-*b* in a TMGI monitoring request message. The relay UE 115-*b* may then receive packets for the TMGI in DL communication from the network and retransmit the packets to the remote UE 115-*a*. As an example, the retransmission may be in a PC5 interface using the priority level which was indicated for this TMGI by the remote UE 115-*a*.

In some cases, a conflict may arise when a relay UE 115-*b* may receive different priority levels from different remote UE 115 for the same TMGI. To resolve this conflict, the relay UE 115-*b* may use the maximum received PPP value for the TMGI when retransmitting to the remote UE 115-*a*. Alternatively, remote UE 115 may provide a time stamp indicating when TMGI and PPP mapping were received from the application server. Then the relay UE 115-*b* may use the latest PPP for that TMGI when retransmitting.

Figure 3:
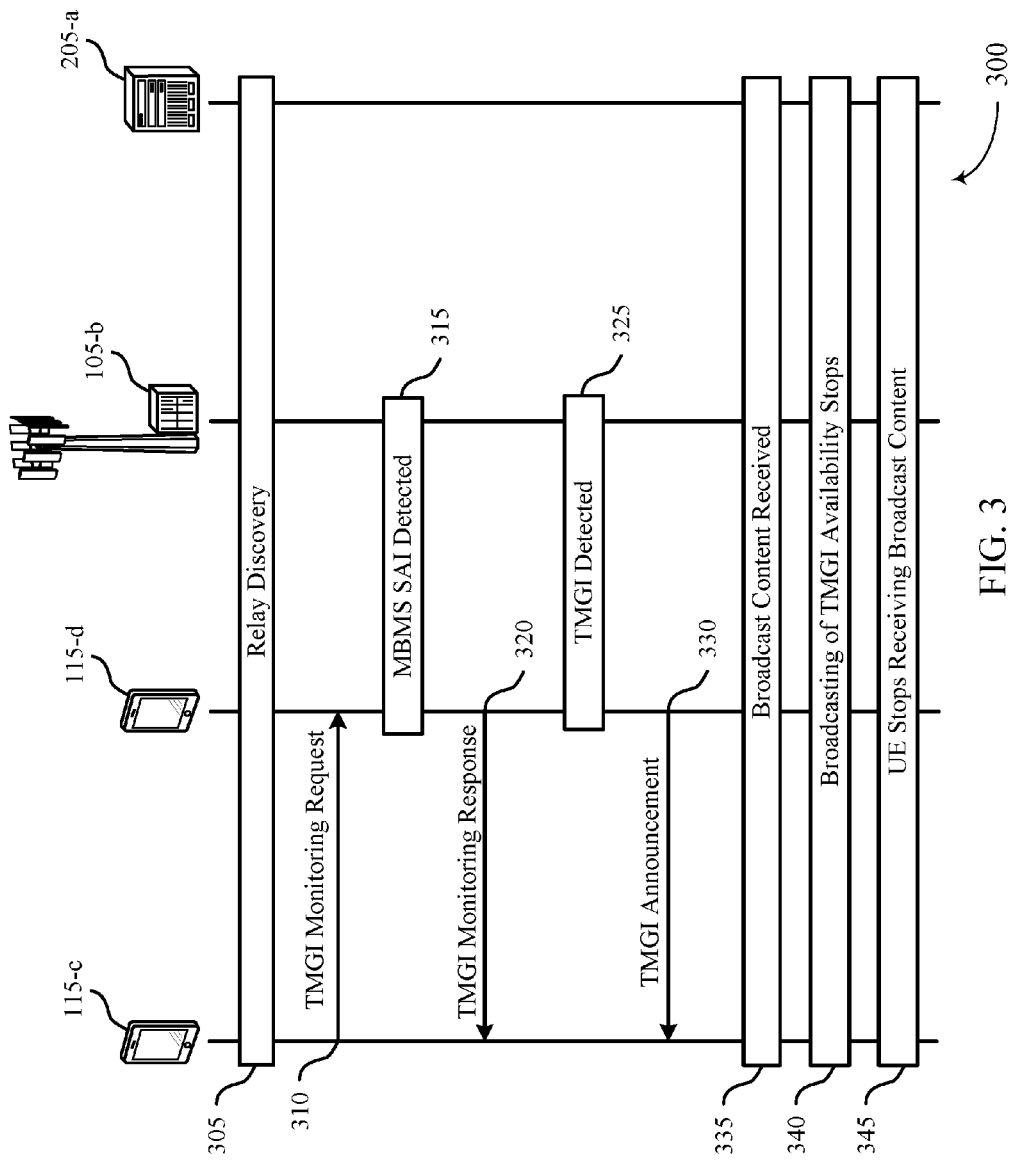
FIG. 3 illustrates an example of a process flow for packet priority for eMBMS service relays in accordance with various aspects of the present disclosure.

FIG. 3 illustrates an example of a process flow 300 for packet priority for eMBMS service relays in accordance with various aspects of the present disclosure. Process flow 300 may include a UEs 115-*c* and 115-*d*, base station 105-*b*, and application server 205-*a*, which may be examples of a UE 115 and base station 105 described with reference to FIGS. 1-2.

At step 305, UE 115-*c* may establish a relay D2D communications link with UE 115-*d* and configure an MBMS or eMBMS with application server 205-*a*. As an example, UE 115-*c* may receive a configuration message for a broadcast service from application server 205-*a*. In some cases, the configuration message may be a group communication identifier and priority indicator. In some cases, a group communication identifier may include a TMGI. Additionally, the configuration message may be received via UE 115-*d* and the broadcast may be an eMBMS.

At step 310 UE 115-*c* may transmit to UE 115-*d* a monitoring request signal. As an example, UE 115-*c* may transmit the monitoring request based on a ProSe signaling protocol. In some cases, the monitoring request may be the group communication identifier and the priority indicator. In some example, the monitoring request may also include a time stamp to enable the relay device to identify a latest PPP associated with the group communication identifier (e.g., the TMGI).

At step 315, UE 115-*d* may detect an eMBMS service area identifier (SAI) from base station 105-*b*. At step 320, UE 115-*d* may transmit a configuration response to UE 115-*c*. At step 325, UE 115-*d* may detect a configuration message from the base station 105-*b*, where the configuration message may be the group communication identifier and the priority indicator. At step 330, UE 115-*d* may transmit a group communication announcement message to UE 115-*c*.

At step 335, UE 115-*d* may receive broadcast content associated with the group communication request and may relay the broadcast to UE 115-*c* based on the priority indicator. In some cases, UE 115-*d* may receive a second priority indicator associated with the group communication identifier. UE 115-*d* may then identify a maximum priority indicator from a set comprising the priority indicator and the second priority indicator. UE 115-*d* may relay the broadcast content based on the maximum priority indicator. In some examples, UE 115-*c* may determine a last received priority indicator from a set of priority indicators, which may be based on the time stamp.

At step 340, UE 115-*d* may stop broadcasting broadcast content availability and UE 115-*c* may request an unicast distribution leg. At step 345, UE 115-*c* may stop receiving the broadcast content.

Figure 4:
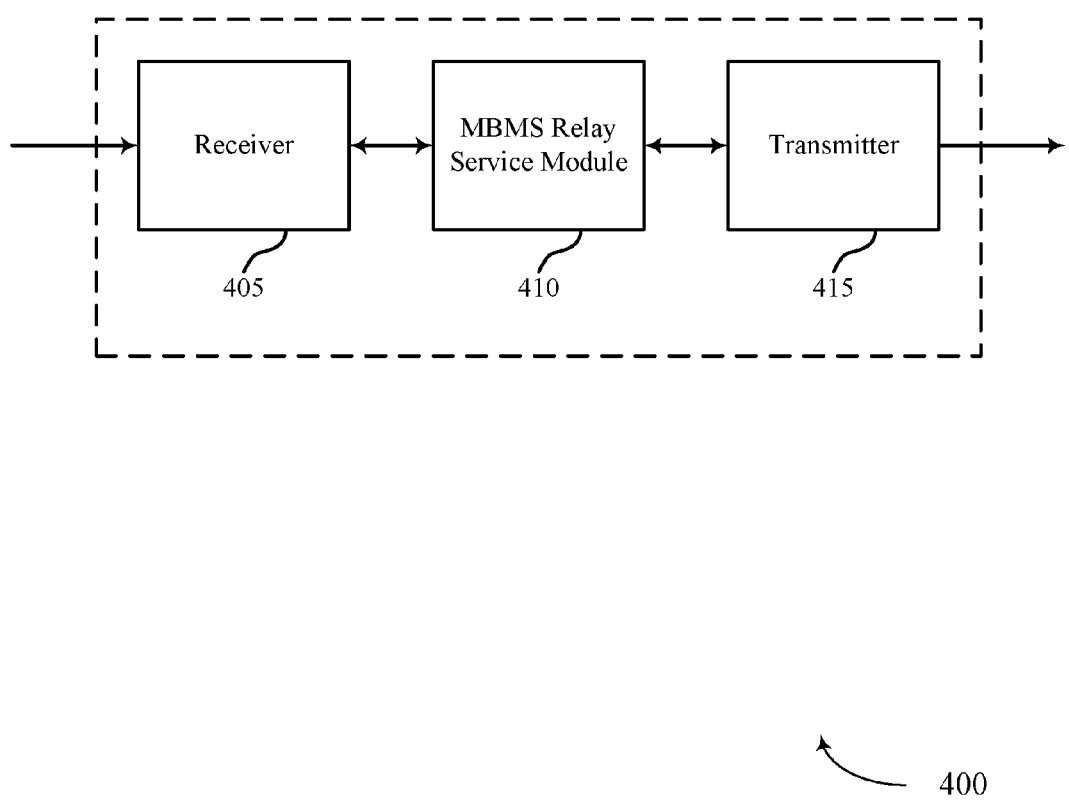
FIGS. 4-6 show block diagrams of a wireless device for packet priority for eMBMS service relays in accordance with various aspects of the present disclosure.

FIG. 4 shows a block diagram of a wireless device 400 configured for packet priority for eMBMS service relays in accordance with various aspects of the present disclosure. Wireless device 400 may be an example of aspects of a UE 115 described with reference to FIGS. 1-3. Wireless device 400 may include a receiver 405, an MBMS relay service module 410, or a transmitter 415. Wireless device 400 may also include a processor. Each of these components may be in communication with each other.

The receiver 405 may receive information such as packets, user data, or control information associated with various information channels (e.g., control channels, data channels, and information related to packet priority for eMBMS service relays, etc.). Information may be passed on to the MBMS relay service module 410, and to other components of wireless device 400.

The MBMS relay service module 410 may receive a configuration message for a broadcast service, the configuration message including a group communication identifier and a priority indicator, transmit, to a wireless relay, a monitoring request including the group communication identifier and the priority indicator, and receive broadcast content for the broadcast service via the wireless relay based on the group communication identifier and the priority indicator. In some cases, a group communication identifier may include a TMGI.

The transmitter 415 may transmit signals received from other components of wireless device 400. In some examples, the transmitter 415 may be collocated with the receiver 405 in a transceiver module. The transmitter 415 may include a single antenna, or it may include a plurality of antennas.

Figure 5:
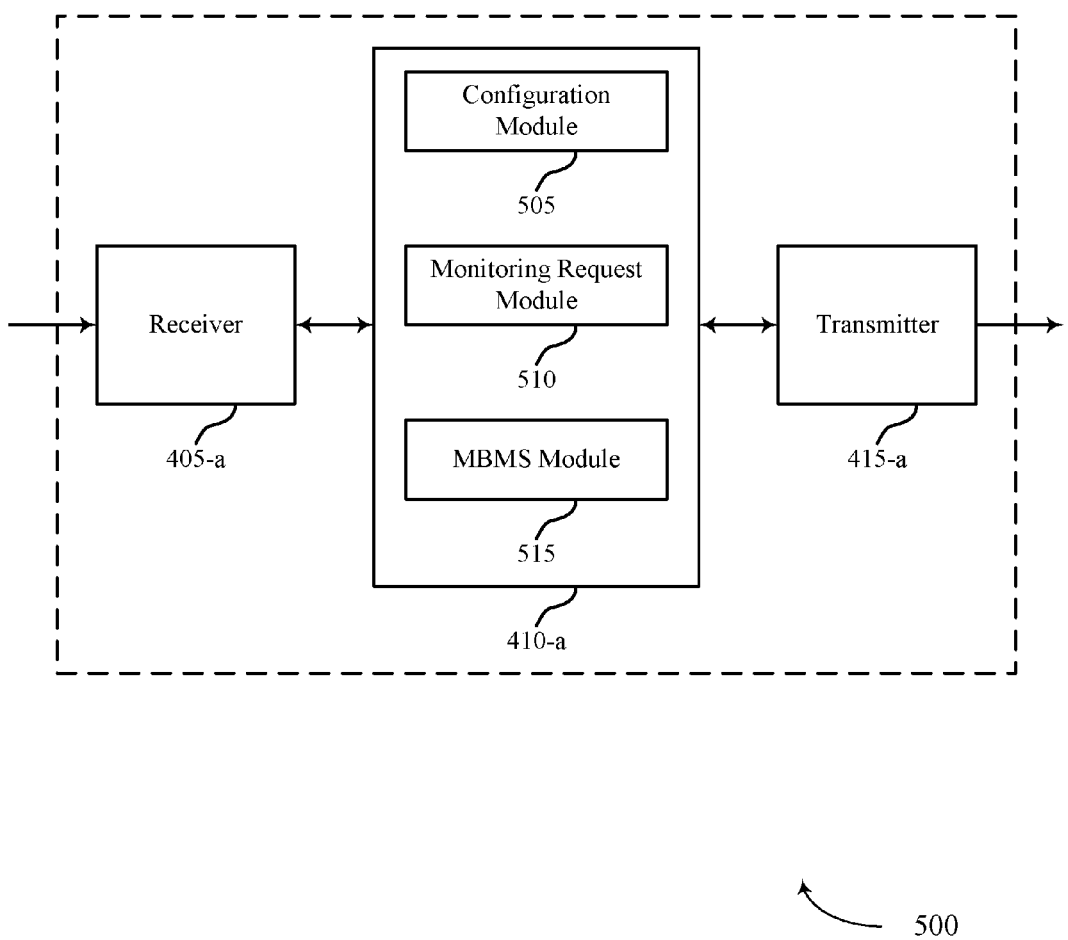

FIG. 5 shows a block diagram of a wireless device 500 for packet priority for eMBMS service relays in accordance with various aspects of the present disclosure. Wireless device 500 may be an example of aspects of a wireless device 400 or a UE 115 described with reference to FIGS. 1-4. Wireless device 500 may include a receiver 405-*a*, an MBMS relay service module 410-*a*, or a transmitter 415-*a*. Wireless device 500 may also include a processor. Each of these components may be in communication with each other. The MBMS relay service module 410-*a* may also include a configuration module 505, a monitoring request module 510, and an MBMS module 515.

The receiver 405-*a* may receive information which may be passed on to MBMS relay service module 410-*a*, and to other components of wireless device 500. The MBMS relay service module 410-*a* may perform the operations described with reference to FIG. 4. The transmitter 415-*a* may transmit signals received from other components of wireless device 500.

The configuration module 505 may receive a configuration message for a broadcast service, the configuration message including a group communication identifier and a priority indicator as described with reference to FIGS. 2-3. In some cases, a group communication identifier may include a TMGI. The configuration module 505 may receive the configuration message via the wireless relay.

The monitoring request module 510 may transmit, to a wireless relay, a monitoring request including the group communication identifier and the priority indicator as described with reference to FIGS. 2-3. In some examples, the monitoring request includes a time stamp. The monitoring request module 510 may transmit the monitoring request based on a ProSe signaling protocol.

The MBMS module 515 may receive broadcast content for the broadcast service via the wireless relay based on the group communication identifier and the priority indicator as described with reference to FIGS. 2-3. In some examples, the broadcast service includes an eMBMS. The MBMS module 515 may also receive broadcast content associated with a group communication request for relay to another UE 115.

Figure 6:
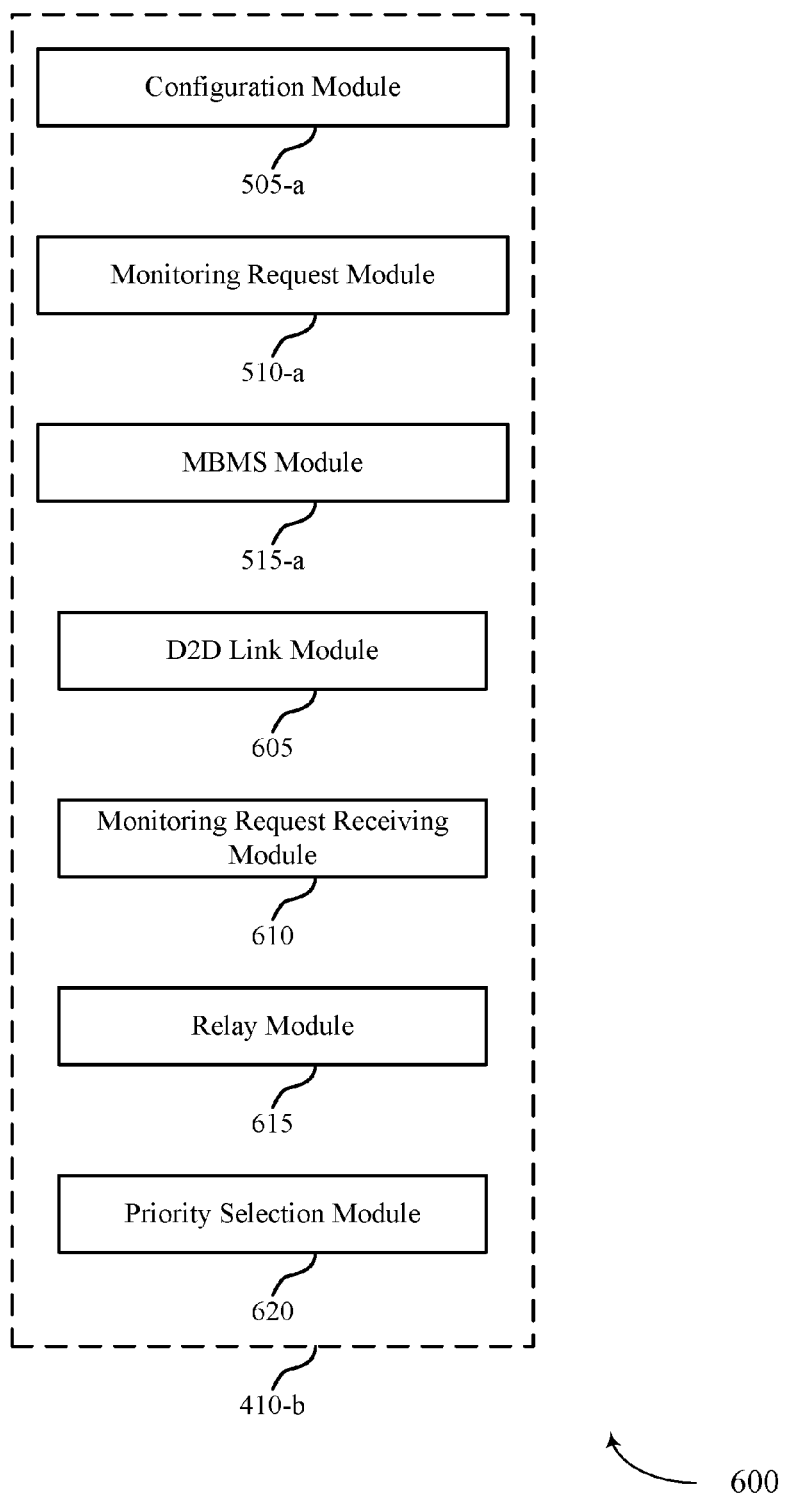

FIG. 6 shows a block diagram 600 of an MBMS relay service module 410-*b* which may be a component of a wireless device 400 or a wireless device 500 for packet priority for eMBMS service relays in accordance with various aspects of the present disclosure. The MBMS relay service module 410-*b* may be an example of aspects of an MBMS relay service module 410 described with reference to FIGS. 4-5. The MBMS relay service module 410-*b* may include a configuration module 505-*a*, a monitoring request module 510-*a*, and an MBMS module 515-*a*. Each of these modules may perform the functions described with reference to FIG. 5. The MBMS relay service module 410-*b* may also include a D2D link module 605, a monitoring request receiving module 610, a relay module 615, and a priority selection module 620.

The D2D link module 605 may establish a D2D communications link with the wireless relay as described with reference to FIGS. 2-3. The monitoring request receiving module 610 may receive, from a remote wireless device, a monitoring request including a group communication identifier and a priority indicator as described with reference to FIGS. 2-3. In some cases, a group communication identifier may include a TMGI. In some examples, the monitoring request may be transmitted based on a ProSe signaling protocol.

The relay module 615 may relay the broadcast content to a remote wireless device based on the priority indicator as described with reference to FIGS. 2-3. The relay module 615 may also relay a configuration message to the remote wireless device, the configuration message including a group communication identifier and a priority indicator.

The priority selection module 620 may receive a second priority indicator associated with the group communication identifier as described with reference to FIGS. 2-3. The priority selection module 620 may also identify a maximum priority indicator from a set including the priority indicator and the second priority indicator, such that relaying the broadcast content is based on the maximum priority indicator. In some examples, the monitoring request includes a time stamp. In some examples, priority selection module 620 may determine a last received priority indicator from a set including the priority indicator and the second priority indicator based on the time stamp, such that the broadcast content is be based on the last received priority indicator.

Figure 7:
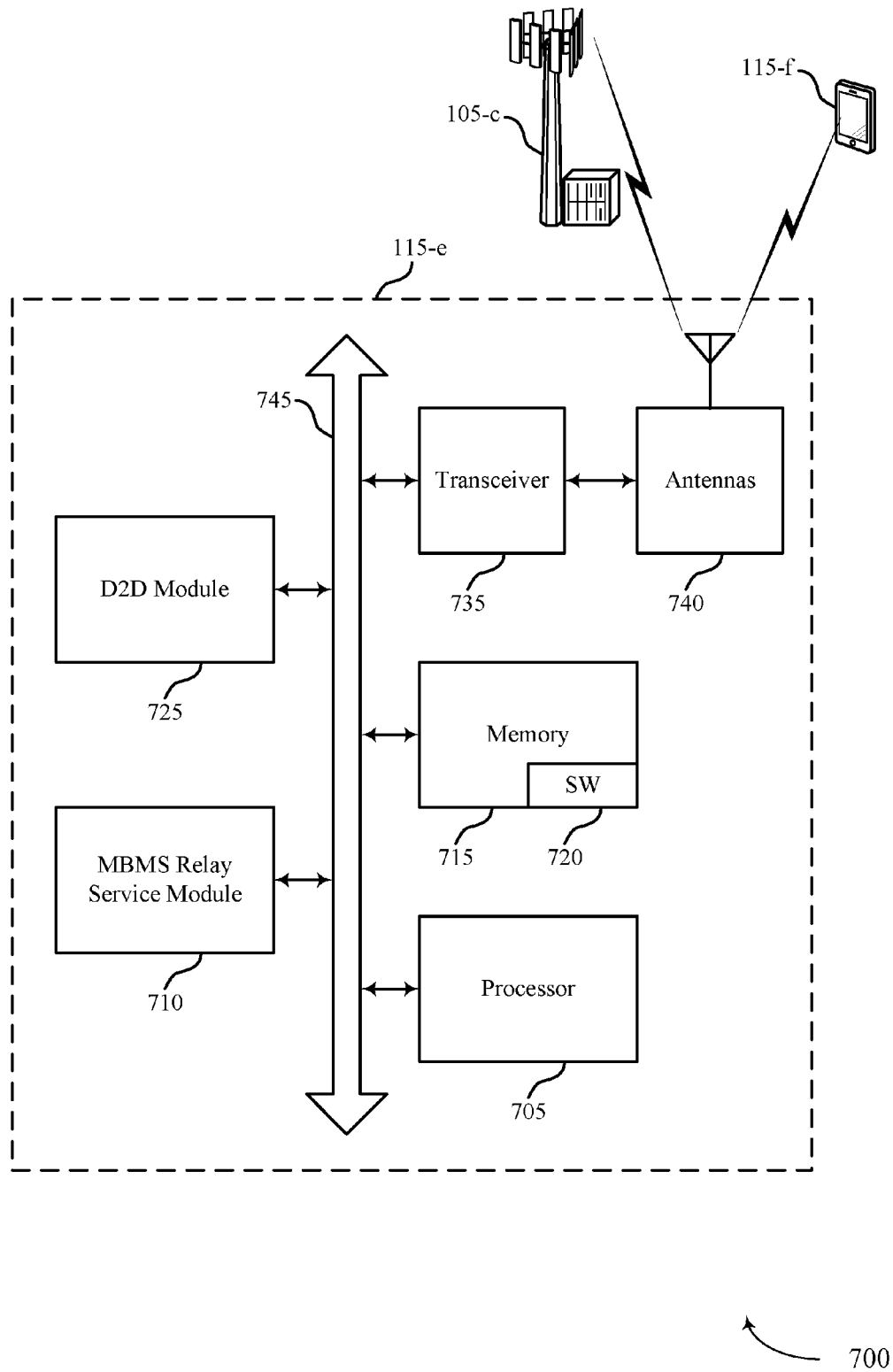
FIG. 7 shows a diagram of a system including a user equipment (UE) configured for packet priority for eMBMS service relays in accordance with various aspects of the present disclosure.

FIG. 7 shows a diagram of a system 700 including a UE 115 configured for packet priority for eMBMS service relays in accordance with various aspects of the present disclosure. System 700 may include UE 115-*e*, which may be an example of a wireless device 400, a wireless device 500, or a UE 115 described with reference to FIGS. 1, 2 and 4-6. UE 115-*f* may include an MBMS relay service module 710, which may be an example of an MBMS relay service module 410 described with reference to FIGS. 4-6. UE 115-*e* may also include a D2D module 725, which may support D2D operations as described herein. UE 115-*e* may also include components for bi-directional voice and data communications including components for transmitting communications and components for receiving communications. For example, UE 115-*e* may communicate bi-directionally with UE 115-*f* or base station 105-*c*. In some examples, UE 115-*e* may represent a remote UE 115 and in other examples UE 115-*e* may represent a relay device.

UE 115-*e* may also include a processor 705, and memory 715 (including software (SW)) 720, a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with a base station 105 or another UE 115. The transceiver 735 may include a modem to modulate the packets and provide the modulated packets to the antenna(s) 740 for transmission, and to demodulate packets received from the antenna(s) 740. While UE 115-*e* may include a single antenna 740, UE 115-*e* may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor 705 to perform various functions described herein (e.g., packet priority for eMBMS service relays, etc.). Alternatively, the software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an application specific integrated circuit (ASIC), etc.)

The components of wireless device 400, wireless device 500, MBMS relay service module 410, and system 700 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of ICs may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
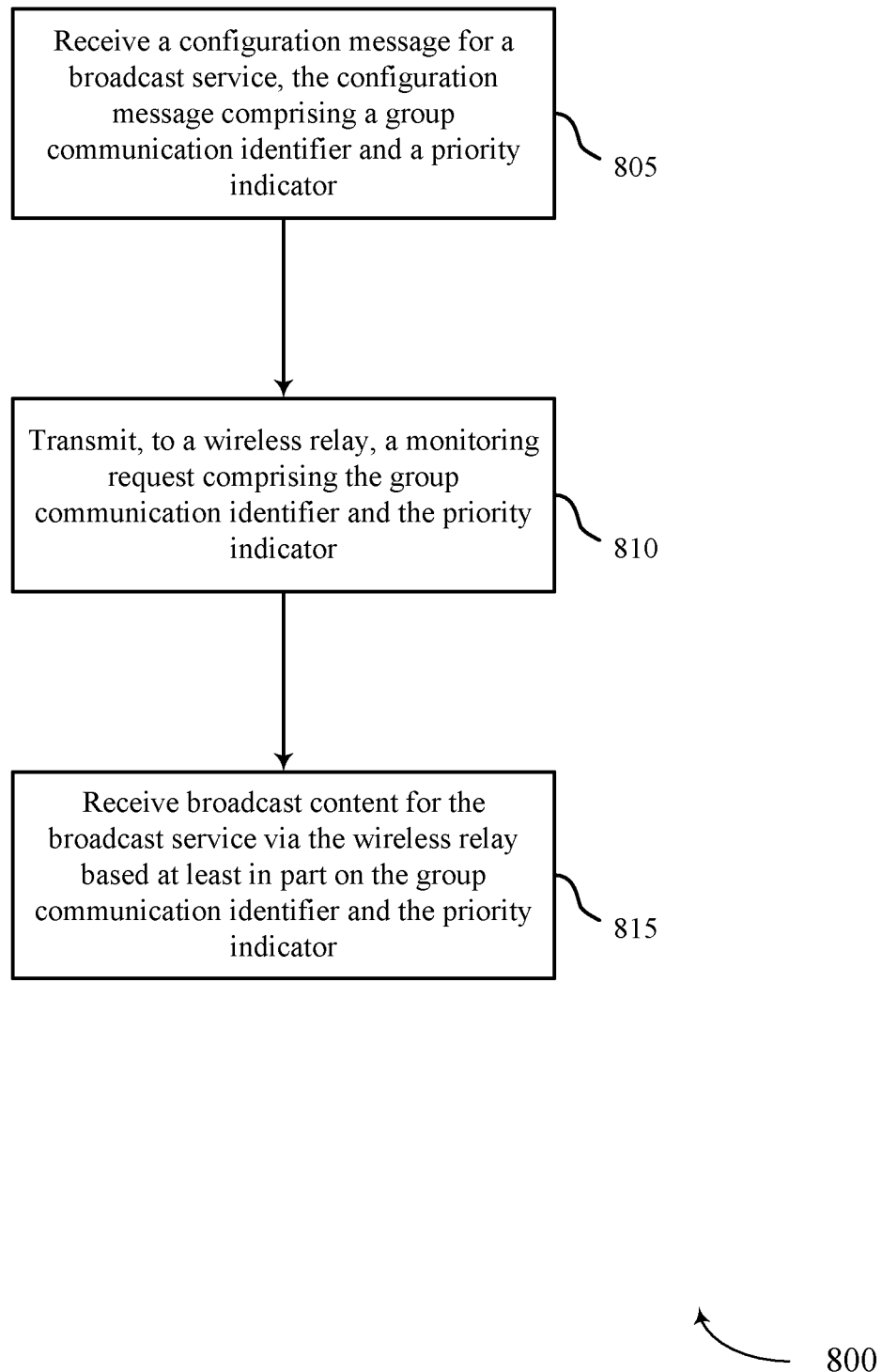
FIGS. 8-10 show flowcharts illustrating methods for packet priority for eMBMS service relays in accordance with various aspects of the present disclosure.

FIG. 8 shows a flowchart illustrating a method 800 for packet priority for eMBMS service relays in accordance with various aspects of the present disclosure. The operations of method 800 may be implemented by a UE 115 or its components as described with reference to FIGS. 1-7. For example, the operations of method 800 may be performed by the MBMS relay service module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 805, the UE 115 may receive a configuration message for a broadcast service, the configuration message comprising a group communication identifier and a priority indicator as described with reference to FIGS. 2-3. In some cases, a group communication identifier may include a TMGI. In certain examples, the operations of block 805 may be performed by the configuration module 505 as described with reference to FIG. 5.

At block 810, the UE 115 may transmit, to a wireless relay, a monitoring request comprising the group communication identifier and the priority indicator as described with reference to FIGS. 2-3. In certain examples, the operations of block 810 may be performed by the monitoring request module 510 as described with reference to FIG. 5.

At block 815, the UE 115 may receive broadcast content for the broadcast service via the wireless relay based at least in part on the group communication identifier and the priority indicator as described with reference to FIGS. 2-3. In certain examples, the operations of block 815 may be performed by the MBMS module 515 as described with reference to FIG. 5.

Figure 9:
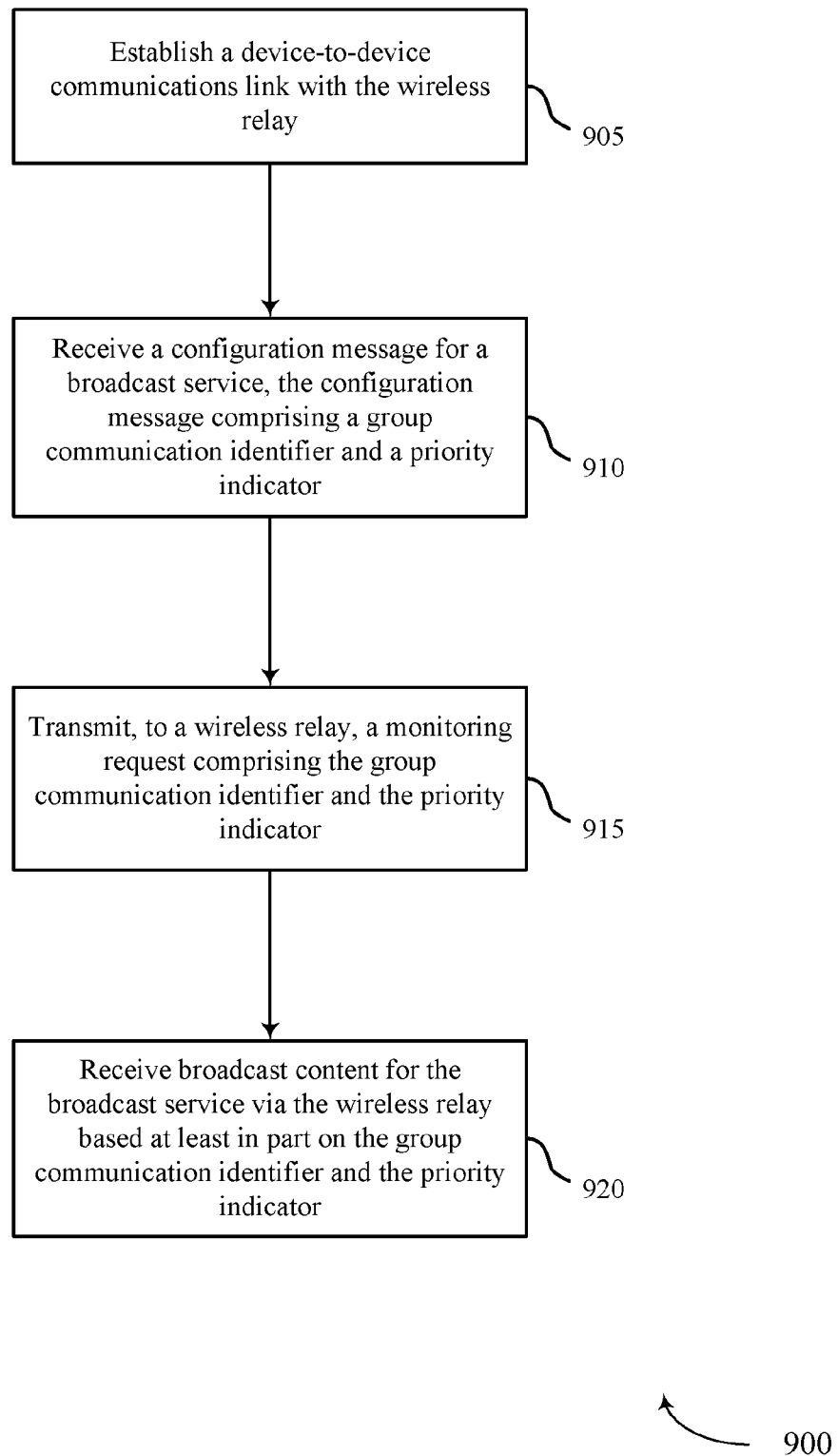

FIG. 9 shows a flowchart illustrating a method 900 for packet priority for eMBMS service relays in accordance with various aspects of the present disclosure. The operations of method 900 may be implemented by a UE 115 or its components as described with reference to FIGS. 1-7. For example, the operations of method 900 may be performed by the MBMS relay service module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 900 may also incorporate aspects of method 800 of FIG. 8.

At block 905, the UE 115 may establish a D2D communications link with the wireless relay as described with reference to FIGS. 2-3. In certain examples, the operations of block 905 may be performed by the D2D link module 605 as described with reference to FIG. 6.

At block 910, the UE 115 may receive a configuration message for a broadcast service, the configuration message comprising a group communication identifier and a priority indicator as described with reference to FIGS. 2-3. In some cases, a group communication identifier may include a TMGI. In certain examples, the operations of block 910 may be performed by the configuration module 505 as described with reference to FIG. 5.

At block 915, the UE 115 may transmit, to a wireless relay, a monitoring request comprising the group communication identifier and the priority indicator as described with reference to FIGS. 2-3. In certain examples, the operations of block 915 may be performed by the monitoring request module 510 as described with reference to FIG. 5.

At block 920, the UE 115 may receive broadcast content for the broadcast service via the wireless relay based at least in part on the group communication identifier and the priority indicator as described with reference to FIGS. 2-3. In certain examples, the operations of block 920 may be performed by the MBMS module 515 as described with reference to FIG. 5.

Figure 10:
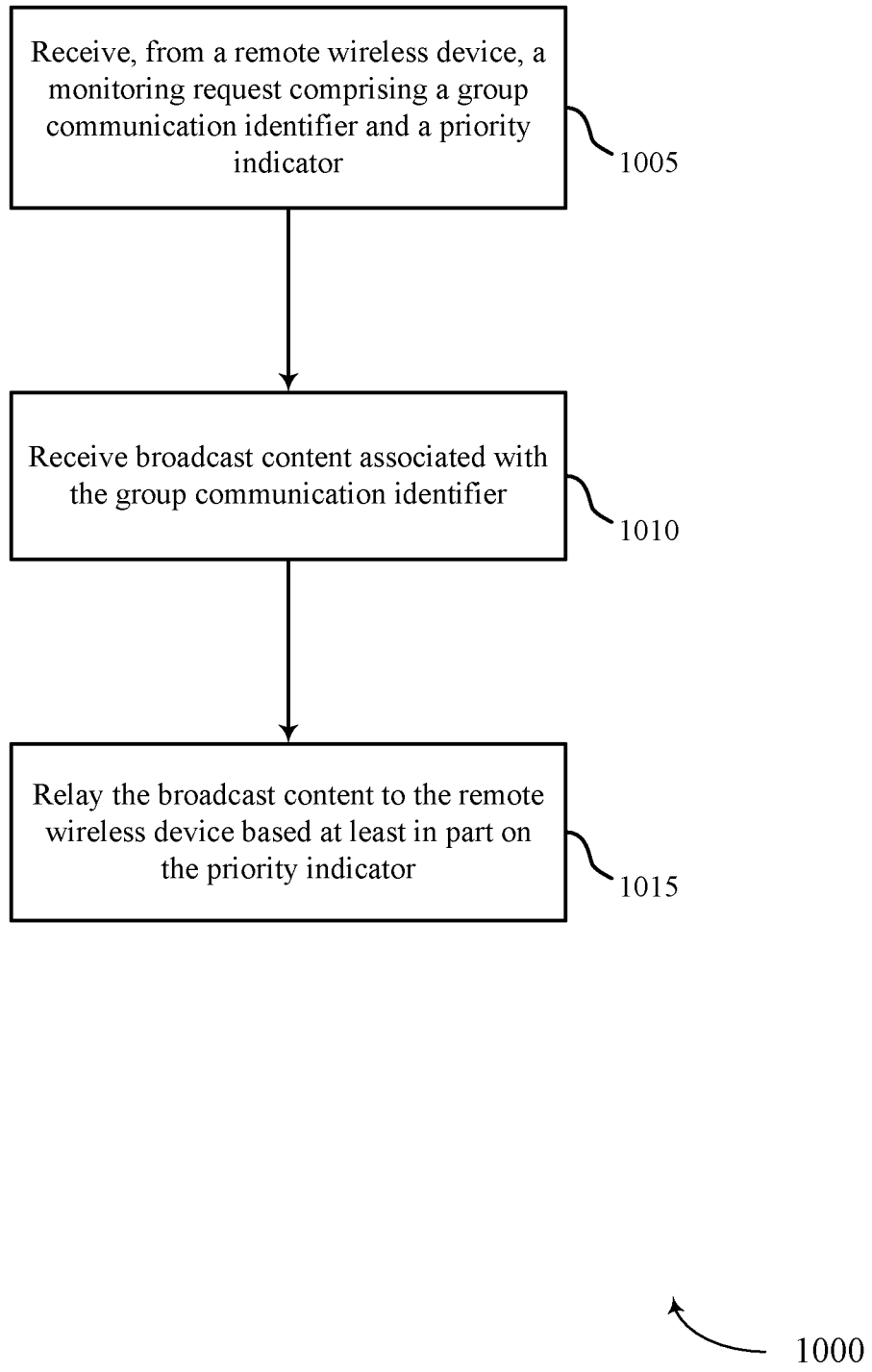

FIG. 10 shows a flowchart illustrating a method 1000 for packet priority for eMBMS service relays in accordance with various aspects of the present disclosure. The operations of method 1000 may be implemented by a relay device such as a UE 115 or its components as described with reference to FIGS. 1-7. For example, the operations of method 1000 may be performed by the MBMS relay service module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1000 may also incorporate aspects of methods 800 and 900 of FIGS. 8-9.

At block 1005, the UE 115 may receive, from a remote wireless device, a monitoring request including a group communication identifier and a priority indicator as described with reference to FIGS. 2-3. In some cases, a group communication identifier may include a TMGI. In certain examples, the operations of block 1005 may be performed by the monitoring request receiving module 610 as described with reference to FIG. 6.

At block 1010, the UE 115 may receive broadcast content associated with the group communication identifier as described with reference to FIGS. 2-3. In certain examples, the operations of block 1010 may be performed by the MBMS module 515 as described with reference to FIG. 5.

At block 1015, the UE 115 may relay the broadcast content to the remote wireless device based on the priority indicator as described with reference to FIGS. 2-3. In certain examples, the operations of block 1015 may be performed by the relay module 615 as described with reference to FIG. 6.

Thus, methods 800, 900, and 1000 may provide for packet priority for eMBMS service relays. It should be noted that methods 800, 900, and 1000 describe possible implementation, and that the operations and the steps may be rearranged or otherwise modified such that other implementations are possible. In some examples, aspects from two or more of the methods 800, 900, and 1000 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). "3rd Generation Partnership Project" (3GPP) Long Term Evolution (LTE) and LTE-advanced (LTE-a) are new releases of UMTS that use E-UTRA. UTRA, E-UTRA, UMTS, LTE, LTE-a, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved eNB may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   receiving a configuration message for a broadcast service, the configuration message comprising a group communication identifier and a priority indicator;
   transmitting, from a remote wireless device to a wireless relay, a monitoring request comprising the group communication identifier, the priority indicator, and a time stamp; and
   receiving broadcast content for the broadcast service via the wireless relay based at least in part on the group communication identifier and a last received priority indicator, wherein the last received priority indicator is determined based at least in part on the time stamp, and wherein the last received priority indicator is determined from a set of priority indicators comprising the priority indicator and a second priority indicator associated with the group communication identifier.

2. The method of claim 1, further comprising:
   receiving the configuration message via the wireless relay.

3. The method of claim 1, further comprising:
   establishing a device-to-device (D2D) communications link with the wireless relay.

4. The method of claim 1, further comprising:
   transmitting the monitoring request based at least in part on a Proximity-based Service (ProSe) signaling protocol.

5. The method of claim 1, wherein the broadcast service comprises an evolved multimedia broadcast multicast service (eMBMS).

6. The method of claim 1, wherein the group communication identifier comprises a temporary mobile group identity (TMGI).

7. A method of wireless communication, comprising:
   receiving, from a remote wireless device, a monitoring request comprising a group communication identifier, a priority indicator, and a time stamp;
   receiving a second priority indicator associated with the group communication identifier;
   determining a last received priority indicator based at least in part on the time stamp, wherein the last received priority indicator is determined from a set of priority indicators comprising the priority indicator and the second priority indicator;
   receiving broadcast content associated with the group communication identifier; and
   relaying the broadcast content to the remote wireless device based at least in part on the determined last received priority indicator.

8. The method of claim 7, further comprising:
   relaying a configuration message to the remote wireless device, the configuration message comprising the group communication identifier and the priority indicator.

9. The method of claim 7, further comprising: identifying a maximum priority indicator from a set comprising the priority indicator and the second priority indicator, wherein relaying the broadcast content is based at least in part on the maximum priority indicator.

10. The method of claim 7, further comprising:
    establishing a device-to-device (D2D) communications link with the remote wireless device.

11. The method of claim 7, wherein the monitoring request is transmitted based at least in part on a Proximity-based Service (ProSe) signaling protocol.

12. The method of claim 7, wherein the broadcast content comprises evolved multimedia broadcast multicast service (eMBMS) content.

13. The method of claim 7, wherein the group communication identifier comprises a temporary mobile group identity (TMGI).

14. An apparatus for wireless communication, comprising:
means for receiving a configuration message for a broadcast service, the configuration message comprising a group communication identifier and a priority indicator;
further means for transmitting, from a remote wireless device to a wireless relay, a monitoring request comprising the group communication identifier, the priority indicator, and a time stamp; and
means for receiving broadcast content for the broadcast service via the wireless relay based at least in part on the group communication identifier and a last received priority indicator, wherein the last received priority indicator is determined based at least in part on the time stamp, and wherein the last received priority indicator is determined from a set of priority indicators comprising the priority indicator and a second priority indicator associated with the group communication identifier.

15. The apparatus of claim 14, further comprising:
means for receiving the configuration message via the wireless relay.

16. The apparatus of claim 14, further comprising:
means for establishing a device-to-device (D2D) communications link with the wireless relay.

17. The apparatus of claim 14, further comprising:
further means for transmitting the monitoring request based at least in part on a Proximity-based Service (ProSe) signaling protocol.

18. The apparatus of claim 14, wherein the broadcast service comprises an evolved multimedia broadcast multicast service (eMBMS).

19. The apparatus of claim 14, wherein the group communication identifier comprises a temporary mobile group identity (TMGI).

20. An apparatus for wireless communication, comprising:
means for receiving, from a remote wireless device, a monitoring request comprising a group communication identifier, a priority indicator, and a time stamp;
means for receiving a second priority indicator associated with the group communication identifier;
means for determining a last received priority indicator based at least in part on the time stamp, wherein the last received priority indicator is determined from a set of priority indicators comprising the priority indicator and the second priority indicator;
means for receiving broadcast content associated with the group communication identifier; and
further means for relaying the broadcast content to the remote wireless device based at least in part on the determined last received priority indicator.

21. The apparatus of claim 20, further comprising:
further means for relaying a configuration message to the remote wireless device, the configuration message comprising the group communication identifier and the priority indicator.

22. The apparatus of claim 20, further comprising: means for identifying a maximum priority indicator from a set comprising the priority indicator and the second priority indicator, wherein relaying the broadcast content is based at least in part on the maximum priority indicator.

23. The apparatus of claim 20, further comprising:
means for establishing a device-to-device (D2D) communications link with the remote wireless device.

24. The apparatus of claim 20, wherein the monitoring request is transmitted based at least in part on a Proximity-based Service (ProSe) signaling protocol.

25. The apparatus of claim 20, wherein the broadcast content comprises evolved multimedia broadcast multicast service (eMBMS) content.

26. The apparatus of claim 20, wherein the group communication identifier comprises a temporary mobile group identity (TMGI).

27. An apparatus for wireless communication, comprising:
a processor;
memory in electronic communication with the processor; and
instructions stored in the memory and operable, when executed by the processor, to cause the apparatus to:
receive a configuration message for a broadcast service, the configuration message comprising a group communication identifier and a priority indicator;
transmit, from a remote wireless device to a wireless relay, a monitoring request comprising the group communication identifier, the priority indicator, and a time stamp; and
receive broadcast content for the broadcast service via the wireless relay based at least in part on the group communication identifier and a last received priority indicator, wherein the last received priority indicator is determined based at least in part on the time stamp, and wherein the last received priority indicator is determined from a set of priority indicators comprising the priority indicator and a second priority indicator associated with the group communication identifier.

28. The apparatus of claim 27, wherein the instructions are operable to cause the apparatus to:
receive the configuration message via the wireless relay.

29. The apparatus of claim 27, wherein the instructions are operable to cause the apparatus to:
establish a device-to-device (D2D) communications link with the wireless relay.

30. The apparatus of claim 27, wherein the instructions are operable to cause the apparatus to:
transmit the monitoring request based at least in part on a Proximity-based Service (ProSe) signaling protocol.

31. The apparatus of claim 27, wherein the broadcast service comprises an evolved multimedia broadcast multicast service (eMBMS).

32. The apparatus of claim 27, wherein the group communication identifier comprises a temporary mobile group identity (TMGI).

33. An apparatus for wireless communication, comprising:
a processor;
memory in electronic communication with the processor; and
instructions stored in the memory and operable, when executed by the processor, to cause the apparatus to:
receive, from a remote wireless device, a monitoring request comprising a group communication identifier, a priority indicator, and a time stamp;
receive a second priority indicator associated with the group communication identifier;

determine a last received priority indicator based at least in part on the time stamp, wherein the last received priority indicator is determined from a set of priority indicators comprising the priority indicator and the second priority indicator;

receive broadcast content associated with the group communication identifier; and relay the broadcast content to the remote wireless device based at least in part on the determined last received priority indicator.

34. The apparatus of claim 33, wherein the instructions are operable to cause the apparatus to:

relay a configuration message to the remote wireless device, the configuration message comprising the group communication identifier and the priority indicator.

35. The apparatus of claim 33, wherein the instructions are operable to cause the apparatus to: identify a maximum priority indicator from a set comprising the priority indicator and the second priority indicator, wherein relaying the broadcast content is based at least in part on the maximum priority indicator.

36. The apparatus of claim 33, wherein the instructions are operable to cause the apparatus to:

establish a device-to-device (D2D) communications link with the remote wireless device.

37. The apparatus of claim 33, wherein the monitoring request is transmitted based at least in part on a Proximity-based Service (ProSe) signaling protocol.

38. The apparatus of claim 33, wherein the broadcast content comprises evolved multimedia broadcast multicast service (eMBMS) content.

39. The apparatus of claim 33, wherein the group communication identifier comprises a temporary mobile group identity (TMGI).

40. A non-transitory computer-readable medium storing code for wireless communication, the code comprising instructions executable to:

receive a configuration message for a broadcast service, the configuration message comprising a group communication identifier and a priority indicator;

transmit, from a remote wireless device to a wireless relay, a monitoring request comprising the group communication identifier, the priority indicator, and a time stamp; and receive broadcast content for the broadcast service via the wireless relay based at least in part on the group communication identifier and a last received priority indicator, wherein the last received priority indicator is determined based at least in part on the time stamp, and wherein the last received priority indicator is determined from a set of priority indicators comprising the priority indicator and a second priority indicator associated with the group communication identifier.

41. A non-transitory computer-readable medium storing code for wireless communication, the code comprising instructions executable to:

receive, from a remote wireless device, a monitoring request comprising a group communication identifier, a priority indicator, and a time stamp;

receive a second priority indicator associated with the group communication identifier:

determine a last received priority indicator based at least in part on the time stamp, wherein the last received priority indicator is determined from a set of priority indicators comprising the priority indicator and the second priority indicator;

receive broadcast content associated with the group communication identifier; and relay the broadcast content to the remote wireless device based at least in part on the determined last received priority indicator.

42. The non-transitory computer-readable medium of claim 41, wherein the instructions are executable to:

relay a configuration message to the remote wireless device, the configuration message comprising the group communication identifier and the priority indicator.

43. The non-transitory computer-readable medium of claim 41, wherein the instructions are executable to: identify a maximum priority indicator from a set comprising the priority indicator and the second priority indicator, wherein relaying the broadcast content is based at least in part on the maximum priority indicator.

* * * * *